United States Patent
Spear et al.

(10) Patent No.: US 7,167,459 B2
(45) Date of Patent: Jan. 23, 2007

(54) INTER-NETWORK HANDOVER IN A PACKET RADIO SYSTEM

(75) Inventors: Stephen L. Spear, Skokie, IL (US); Jeffrey C. Smolinske, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 280 days.

(21) Appl. No.: 11/026,446

(22) Filed: Dec. 30, 2004

(65) Prior Publication Data

US 2006/0148475 A1    Jul. 6, 2006

(51) Int. Cl.
H04Q 7/20 (2006.01)
(52) U.S. Cl. .......... 370/331; 370/332; 370/333; 370/334; 455/436; 455/438; 455/439; 455/426.1; 455/426.2; 455/440; 455/437
(58) Field of Classification Search .......... 370/331, 370/332, 333, 334; 455/436.8, 437, 438, 455/439, 440, 441, 442, 443, 444, 445, 422.1, 455/403, 500, 517, 434, 414.1, 414.4, 414.2, 412.1, 412.2, 550.1, 552.1, 426.1, 426.2

See application file for complete search history.

(56) References Cited

U.S. PATENT DOCUMENTS

2004/0266438 A1* 12/2004 Bjelland et al. .......... 455/437
2006/0018280 A1* 1/2006 Kumar et al. ............ 370/331

FOREIGN PATENT DOCUMENTS

WO    WO 01/74095 A2    10/2001

* cited by examiner

Primary Examiner—Keith Ferguson

(57) ABSTRACT

A method (400) and apparatus (501) facilitate a session handover between a first site and a second site. A wireless communication unit such as a mobile station (102), user equipment (202, 302) can move from one site to another site whereupon new identifiers can be setup for the new site. If a serving node associated with the new site is also new, identifiers can be set up for the new site and the new serving node.

23 Claims, 3 Drawing Sheets

INTER-NETWORK HANDOVER IN A PACKET RADIO SYSTEM

FIELD OF THE INVENTION

The present invention relates in general to wireless communication systems, and more specifically to a method and apparatus for performing handovers across access networks in a wireless cellular communication system.

BACKGROUND OF THE INVENTION

In a General Packet Radio Service (GPRS) system, a handover across Radio Access Network (RAN) boundaries may be necessary when a communication unit such as a mobile station (MS), user equipment (UE), user entity (UE) or the like is moving between RANs. In a conventional inter-RAN handover environment such as in a second generation Global System for Mobile (GSM) system or the like, an external or inter-RAN handover typically involves a Mobile Switching Center (MSC) to support the RAN-to-RAN communications required for the handover.

Conventional, second generation GSM mobile networks, use the MSC to provide an interface with the public fixed network such as the Public Switched Telephone Network (PSTN), or the like. From the perspective of the fixed network, the MSC is just another switching node. From the perspective of the mobile network however, switching or handover is more complicated since the MSC needs to know where the MS is currently located and where it may be heading. As is well known to those of ordinary skill in the art, a GSM system accomplishes location updating and call routing to the MS by using the Home Location Register (HLR) and the Visitor Location Register (VLR).

When the MS notices that the location-area broadcast information is different from that previously stored in the MS memory, by monitoring, for example, the Broadcast Control Channel (BCCH), an update request and the International Mobile Subscriber Identity (IMSI) or previous Temporary Mobile Subscriber Identity (TMSI) is sent to the VLR via the MSC. When a new MSC is encountered, a new Mobile Station Roaming Number (MSRN) is allocated and sent to the HLR associated with the MS by the VLR. The MSRN is a regular telephone number which rather than being assigned to a single user is part of a pool of numbers. The MSRN is used to route the call to the new MSC and is subsequently translated to the IMSI of the mobile. The HLR sends back the necessary call-control parameters, and also sends a cancel message to the old VLR, so that the previous MSRN can be reallocated. Finally, a new TMSI is allocated and sent to the mobile for identification in future paging or call requests.

Conducting handovers using the MSC can give rise to limitations associated with, for example, latency. Further, while the MSC, HLR, VLR model was developed with a circuit switching model in mind, third generation (3G) systems support high speed packet switching. Moreover, since the MSC is not involved in the handover activities of packet services in accordance with 3G system associated with, for example, Universal Mobile Telecommunications Services (UMTS), CDMA 2000 and the like, other solutions are needed to accomplish handover of packet-based calls or sessions, particularly real time packet-based calls or sessions associated with providing support for voice and/or multimedia services.

BRIEF DESCRIPTION OF THE DRAWINGS

The accompanying figures where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
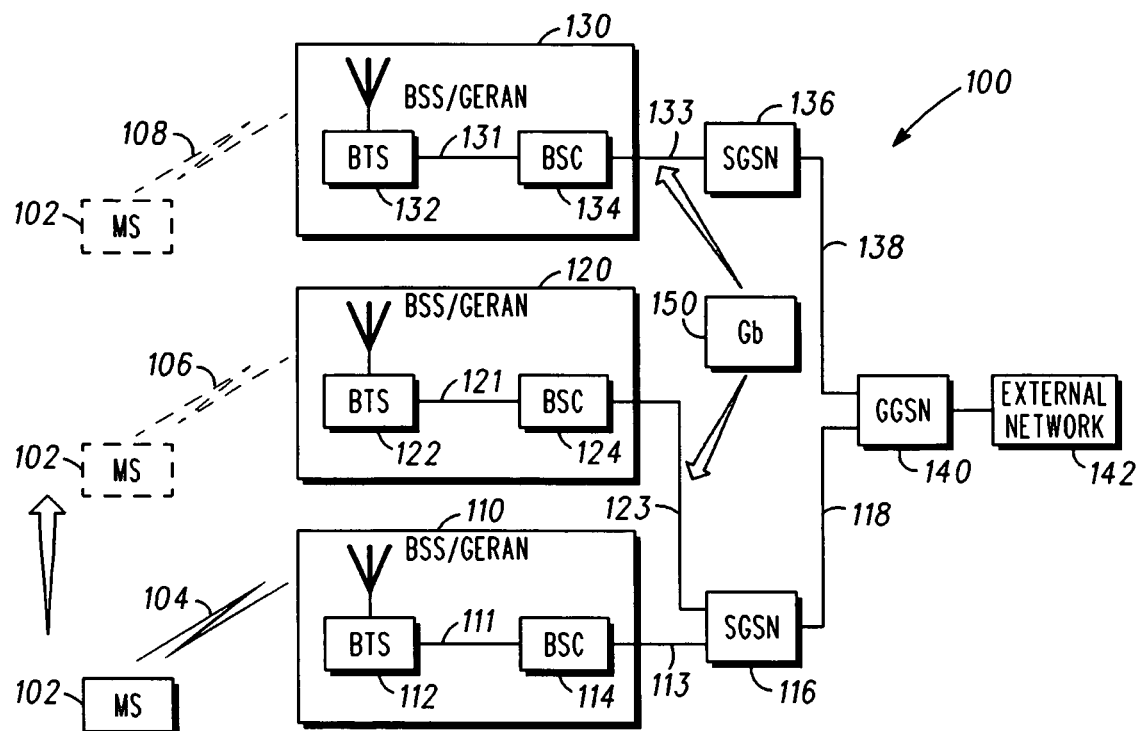
FIG. 1 is a diagram illustrating an exemplary inter-RAN handover for a RAN/GSM/Enhanced Data Rate for GSM (EDGE) RAN (RAN/GERAN) and a Gb interface between an exemplary Serving GPRS Support Node (SGSN) and Base Station Subsystem (BSS) in accordance with various exemplary embodiments.

In overview, the present invention relates to wireless communication systems for facilitating cellular communication between devices or units, often referred to as communication units, such as cellular telephones or two-way radio handsets and the like. More particularly, various inventive concepts and principles are embodied in cellular communication systems, infrastructure components, communication devices, and methods therein for performing such handovers. It should be noted that in addition to connoting a typical handset, the term communication unit may be used interchangeably with mobile station, user entity, user equipment, subscriber unit, wireless subscriber unit, wireless subscriber device or the like. Each of these terms denotes a device ordinarily associated with a user and may include a wireless mobile device that may be used with a public network or within a private network such as an enterprise network. Additional examples of such units include personal digital assistants, personal assignment pads, and other portable personal computers equipped for wireless operation, a cellular handset or device, or equivalents thereof provided such units are arranged and constructed in accordance with the principles and concepts discussed herein. It should further be noted that the present invention is directed to infrastructure components such as GPRS Service Nodes and the like in accordance with various exemplary and alternative exemplary embodiments discussed and described herein.

The present description is provided to further explain, in an enabling fashion, exemplary modes of performing one or more embodiments of the present invention. The description is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and corresponding software or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

In addition to devices of a general nature, the communication devices of particular interest are those providing or facilitating voice/data communications services over cellular wide area networks (WANs), such as conventional two way systems and devices, various cellular phone systems including analog and digital cellular, CDMA (code division multiple access) and variants thereof, GSM, GPRS (General Packet Radio Service), 3G systems such as UMTS (Universal Mobile Telecommunication Service) systems, EDGE (Enhanced Data Rate for GSM) systems, Internet Protocol (IP) Wireless Wide Area Networks like 802.16, 802.20 or Flarion, integrated digital enhanced networks and variants or evolutions thereof. Furthermore the wireless communication units or devices of interest can have short range wireless communications capability normally referred to as WLAN capabilities, such as IEEE 802.11, Bluetooth, or Hiper-Lan and the like preferably using CDMA, frequency hopping, OFDM or TDMA access technologies.

As further discussed herein below, various inventive principles and combinations thereof are advantageously employed to provide input signal generation based on device orientation.

In 3G systems such as system 100 shown in FIG. 1, a RAN such as a Base Station Subsystem/GSM/EDGE Radio Access Network (BSS/GERAN) 110, a BSS/GERAN 120, and a BSS/GERAN 130 in accordance with various exemplary embodiments, provide packet-based real time services to a MS 102 such as services for voice and multimedia. It will be appreciated that the BSS/GERAN 110, the BSS/GERAN 120, and the BSS/GERAN 130 can interact, as will be described, with a core network such as an external network 142, which can be a PSTN, an IP based network, such as the Internet or the like, or a combination of networks, and facilitate connectivity between the MS 102 through the radio portion of the network and the RAN for access to and provision of, for example, Internet based services. Each of the BSS/GERAN 110, the BSS/GERAN 120, and the BSS/GERAN 130 can be configured with a Base Transceiver Station (BTS) and a Base Station Controller (BSC) coupled through a bus or other connection as would be appreciated by one of ordinary skill, such as a BTS 112 and a BSC 114 coupled through a connection 111 for the BSS/GERAN 110, a BTS 122 and a BSC 124 coupled through a connection 121 for the BSS/GERAN 120, and a BTS 132 and a BSC 134 coupled through a connection 131 for the BSS/GERAN 130.

The MS 102 can establish a connection with, for example, the BTS 112 of the BSS/GERAN 110 through an air interface link 104 as will be appreciated by one of ordinary skill. As the MS 102 moves within the exemplary environment, a new link 106 can be established with BTS 122 of the BSS/GERAN 120, and as the MS 102 moves further a new link 108 with BTS 132 of the BSS/GERAN 130 can be established in a novel manner to be described in greater detail hereinafter.

In an exemplary configuration, system 100 further includes a Serving GPRS Support Node (SGSN) 116 serving the BSS/GERAN 110 and the BSS/GERAN 120, and a SGSN 136 serving the BSS/GERAN 130. The SGSN 116 and the SGSN 136 are coupled to a Gateway GPRS Support Node (GGSN) 140 which may provide an interface to external network 142, such as the public Internet or the like as described above, other mobile service providers' GPRS services, enterprise intranets, or the like. The GGSN 140 maintains routing information necessary to tunnel protocol data units (PDUs) addressed, for example to the MS 102, to the SGSN 116 using GPRS Tunneling Protocol (GTP) over the interface 118. The SGSN 116 then sends the information to the BSS/GERAN 110 over the interface 113 in accordance with, for example, a known Gb interface protocol such as a Gb interface 150, when the MS 102 is in locations associated with the link 104.

When the MS 102 is in a location associated with the link 106, PDUs addressed to the MS 102 can be tunneled to the SGSN 116 using GTP over the interface 118. The SGSN 116 then sends the PDUs to the BSS/GERAN 120 over the interface 123. When the MS 102 is in a location associated with the link 108, PDUs addressed to the MS 102 can be tunneled to the SGSN 136 using GTP over the interface 138. The SGSN 136 then sends the PDUs to the BSS/GERAN 130 over the interface 133. It will be appreciated that the tunneling function of the GGSN 140 includes redirecting inbound packets addressed to the MS 102 according to its original location, for example in connection with the BSS/GERAN 110. The redirected packets are transparently forwarded to the MS 102 at its new location or locations, for example, in connection with the BSS/GERAN 120 or the BSS/GERAN 130 such that packet originators need not know of the tunneling. The GGSN 140 can further provide additional "gateway" functions such as network and subscriber screening and address mapping.

Figure 2:
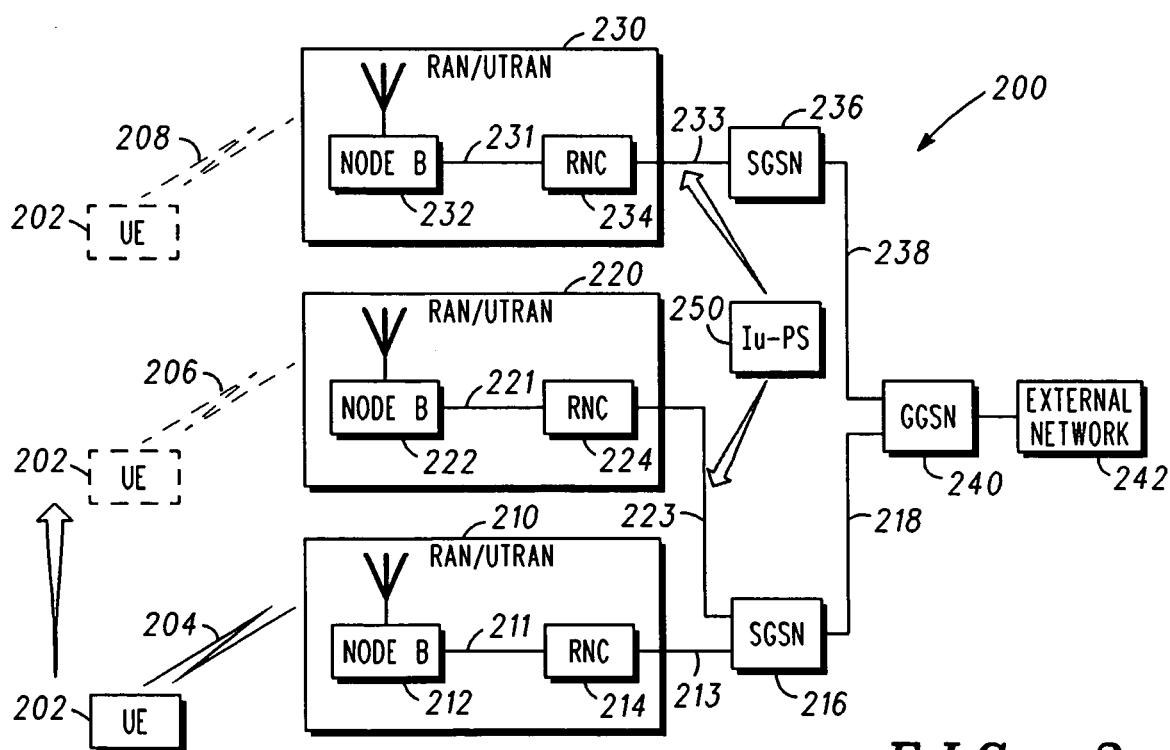
FIG. 2 is a diagram illustrating an exemplary inter-RAN handover for a Universal Mobile Telecommunications Services (UMTS) Terrestrial Radio Access Network (UTRAN) and a Iu-PS interface between an exemplary SGSN and RAN in accordance with various exemplary embodiments.

In other third generation (3G) systems such as system 200 shown in FIG. 2, a RAN such as RAN/Universal Mobile Telecommunications Services (UMTS) Terrestrial Radio Access Network (RAN/UTRAN) 210, a RAN/UTRAN 220, and a RAN/UTRAN 230 in accordance with various exemplary embodiments, also provide packet-based real time services to a User Equipment (UE) 202 such as services for voice and multimedia. The RAN/UTRAN 210, the RAN/UTRAN 220, and the RAN/UTRAN 230 can facilitate connectivity between the UE 202 through the radio portion of the network to Internet based services by facilitating the interaction, as will be described, with a core network such as external network 242, which can be a PSTN, an IP based network, such as the Internet or the like, or a combination of networks. Each of the RAN/UTRAN 210, the RAN/UTRAN 220, and the RAN/UTRAN 230 can be configured with a Node B transceiver and a Radio Network Controller (RNC) coupled through a bus or other connection as would be appreciated by one of ordinary skill, such as a Node B 212 and a RNC 214 coupled through a connection 211 for the RAN/UTRAN 210, a Node B 222 and a RNC 224 coupled through a connection 221 for the RAN/UTRAN 220, and a Node B 232 and a RNC 234 coupled through a connection 231 for the RAN/UTRAN 230.

The UE 202 can establish a connection with, for example, the Node B 212 of the RAN/UTRAN 210 through an air interface link 204 as will be appreciated by one of ordinary skill. As the UE 202 moves within the exemplary environment, a new link 206 can be established with the Node B 222 of the RAN/UTRAN 220, and as the UE 202 moves further, a new link 208 with the Node B 232 of the RAN/UTRAN 230 can be established in a novel manner to be described in greater detail hereinafter.

In an exemplary configuration, system 200 further includes a Serving GPRS Support Node (SGSN) 216 serving the RAN/UTRAN 210 and the RAN/UTRAN 220, and a SGSN 236 serving the RAN/UTRAN 230. The SGSN 216 and the SGSN 236 are coupled to a Gateway GPRS Support Node (GGSN) 240 which may provide an interface to an external network 242, such as the public Internet or the like as described above, other mobile service providers' UMTS services, packet-based services, enterprise intranets, or the like. As described above with reference to FIG. 1, the GGSN 240 maintains routing information necessary to tunnel protocol data units (PDUs) addressed, for example to the UE 202, to the SGSN 216 using GPRS Tunneling Protocol (GTP)) over the interface 218. The SGSN 216 then sends the information to the RAN/UTRAN 210 over the interface 213 using GTP in accordance with, for example, an Iu-ps interface 250, where "Iu-ps" is an interface protocol designator for a packet switched interface which differentiates between the Transport Network Layer and the Radio Network Layer as would be appreciated by one of ordinary skill in the art. It will be appreciated that PDUs are tunneled through the SGSN 216 and the RAN/UTRAN 210 when the UE 202 is in locations associated with the link 204. When the UE 202 is in a location associated with the link 206, PDUs addressed to the UE 202 can be tunneled to the SGSN 216 using GTP over the interface 218. The SGSN 216 then sends the PDUs to the RAN/UTRAN 220 over the interface 223. When the UE 202 is in a location associated with the link 208, PDUs addressed to the UE 202 can be tunneled to the SGSN 236 using GTP over the interface 238. The SGSN 236 then sends the PDUs to the RAN/UTRAN 230 over the interface 233. The Transport Network Layer is a transport platform, which can be independent, between the radio portion and the core network, and the Radio Network Layer handles UMTS specific signaling and user data.

It will be appreciated that the tunneling function of the GGSN 240 includes redirecting inbound packets addressed to the UE 202 according to its original location, for example in connection with the RAN/UTRAN 210. The redirected packets are transparently forwarded to UE 202 at its new location or locations, for example, in connection with the RAN/UTRAN 220 or the RAN/UTRAN 230. The GGSN 240 can further provide additional "gateway" functions such as network and subscriber screening and address mapping.

It should be noted that Universal Terrestrial Radio Access Network (UTRAN) technology provides infrastructure allowing the radio portion of the network to connect to the core network including the ATM (Asynchronous Transfer Mode) network through the Iu-ps interface between the UTRAN and the GSN, including support for Adaptation Layer type 2 (AAL2) and Adaptation Layer type 5 (AAL5). The UTRAN technology further facilitates connectivity between the UE 202 through the radio portion of the network, such as the RAN/UTRAN portion, the complex of GPRS Support Nodes (GSN) and Internet based services.

Figure 3:
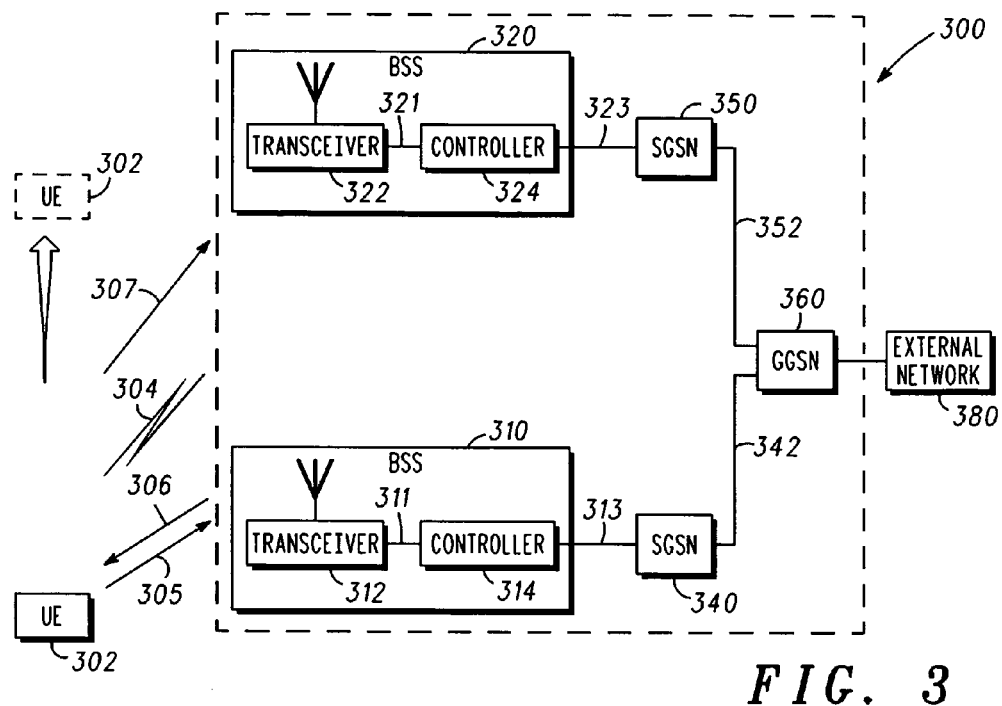
FIG. 3 is a diagram illustrating an exemplary handover sequence in accordance with various exemplary embodiments.

Accordingly, as shown in FIG. 3, which illustrates an exemplary inter-RAN handover environment 300 using, for purposes of illustration, a BSS 310 having a transceiver 312 coupled to a controller 314 through a connection 311 such as a high speed bus, a modem connection or the like as will be appreciated by those of ordinary skill, and a BSS 320 having a transceiver 322 coupled to a controller 324 through a connection 321. The BSS 310 and the BSS 320 can be serviced by a SGSN 340 and a SGSN 350 respectively. The SGSN 340 and the SGSN 350 are coupled through a link 313 and a link 323 respectively to the controller 314 and the controller 324 associated with the BSS 310 and the BSS 320 as noted above, and are coupled to a GGSN 360 through the connections 342 and 352 The GGSN 360 can be used to provide gateway functions to an external network 380, and can tunnel packets from the external network 380 to the UE 302 through the SGSN 340 while the UE 302 is within the range of the BSS 310, and further can tunnel packets to the UE 302 through the SGSN 350 while the UE 302 is within the range of the BSS 320 after a handover within the GSN complex in accordance with various exemplary embodiments as will be described.

As can be appreciated by one of ordinary skill in the art, the GSN complex can consist of SGSN and the GGSN, and thus a handover using the GSN complex in accordance with various exemplary embodiments, includes the SGSN 340 and the GGSN 360 when the UE 302 is within the range of the transceiver 312, and the SGSN 350 and the GGSN 360 when the UE 302 is within the range of the transceiver 322. It will be appreciated that a generalized air interface link 304 is shown for all air interface connections associated with UE 302 and components within the inter-RAN handover environment 300. In accordance with various exemplary embodiments for example, for a handover of service of the UE 302 between the BSS 310 and the BSS 320, the SGSN 340 may be given the task of preparing for or initiating the handover. The SGSN 340 can be configured to take requests on an uplink channel 305 for opening a communications channel from the BSS 310 to the BSS 320, or from one RAN to an adjacent RAN, or the like. Information can be passed to UE 302 on downlink channel 306. It will be appreciated that in accordance with, for example, conventional circuit switched operation, such as when supporting 2G or 2.5G operation in a 3G system, the MSC may take an active role in the handover or can be used to set up the communications, with an exemplary SGSN having the same options. However, the RAN may be better suited to control the handover and provide the required support to enable the communications.

Once it becomes apparent that a handover is going to be executed in one of a variety of manners as will be appreciated by one of ordinary skill, the current RAN such as the BSS 310 should inform the SGSN 340. Accordingly, when a Gb interface is used between the RAN and the SGSN, such as the BSS 310 and the SGSN 340, the SGSN 340 can be configured to set up the Frame Relay Link Layer Identifier (LLI)s in preparation for the exemplary MS, or the like such as the UE 302, arriving at the new cell location, such as within range of the BSS 320 and establishing a new uplink channel 307. If an Iu-ps interface is used, the exemplary SGSN, such as the SGSN 340 must set up the flow IDs for the PDP contexts across the GTP tunnel between it and the new RAN, such as the BSS 320, as will be appreciated by one of ordinary skill in the art.

It will further be appreciated that one or more tunnel identifiers can be established for a first tunnel, for example, between the second RAN and a service node. In the event that a new service node is associated with the second RAN, a second tunnel may also be established between the gateway node and the new service node.

In accordance with various exemplary embodiments, When the RAN to which the UE 302 is moving to, such as the BSS 320 is under the service of a different or "new" SGSN, such as the SGSN 350, the current SGSN, such as the SGSN 340 must communicate with the SGSN 350, directly or via a GGSN, such as the GGSN 360. If a handover is to occur, the SGSN 350 has the responsibility to set up the GTP tunnels and flow IDs for the PDP contexts to the GGSN 360 as well as over Iu-ps interfaces to the RANs such as the BSS 310 and the BSS 320. Further in accordance with various exemplary and alternative exemplary embodiments as described, when a Gb interface is used between an exemplary RAN and an exemplary SGSN, such as during a handover between RANs, the SGSN serving the RAN to which the communication unit, such as the MS is moving to can be configured to set up the TLLIs in preparation for the MS arriving in the serving area of the new RAN.

It should be noted that for an internal, or network initiated handover, data flows must be properly accommodated, such as in order to avoid interrupting the session, and to continue to provide the highest possible level of service, Quality of Service (QoS) or the like consistent with the session parameters. Therefore, in accordance with various exemplary embodiments, the session can include information with a service category such as a QoS value associated therewith, and packets or the like associated with the session can be forwarded to the new site the old site, both sites, or can be held as appropriate based on the service category, QoS value, or the like. For example, if the service category includes real time data, the packets, information or the like associated with the session can be forwarded to both sites to ensure that no information is lost during the handover. If the service category is low, the information can be forwarded to the new site or held until the handover is complete. It will be appreciated that uplink data flows may be handled more easily by allowing uplink data packets which may or may not originate yet from the MS, UE, or the like, to be accepted from either RAN until it is clear through, for example, a data packet having a MAC header attributable to the MS, UE, or the like, has originated from the new RAN.

Downlink data flows require different handling. For example for voice, multimedia and the like real time data flows, which are not configured for packet retransmission on error, sending packets to both the current RAN and the new RAN reduces the probability that packets will be dropped. Other non-real time data flows may be handled via flow control, for example, by putting the data flow on hold until the MS, UE, or the like arrives at the new RAN.

Figure 4:
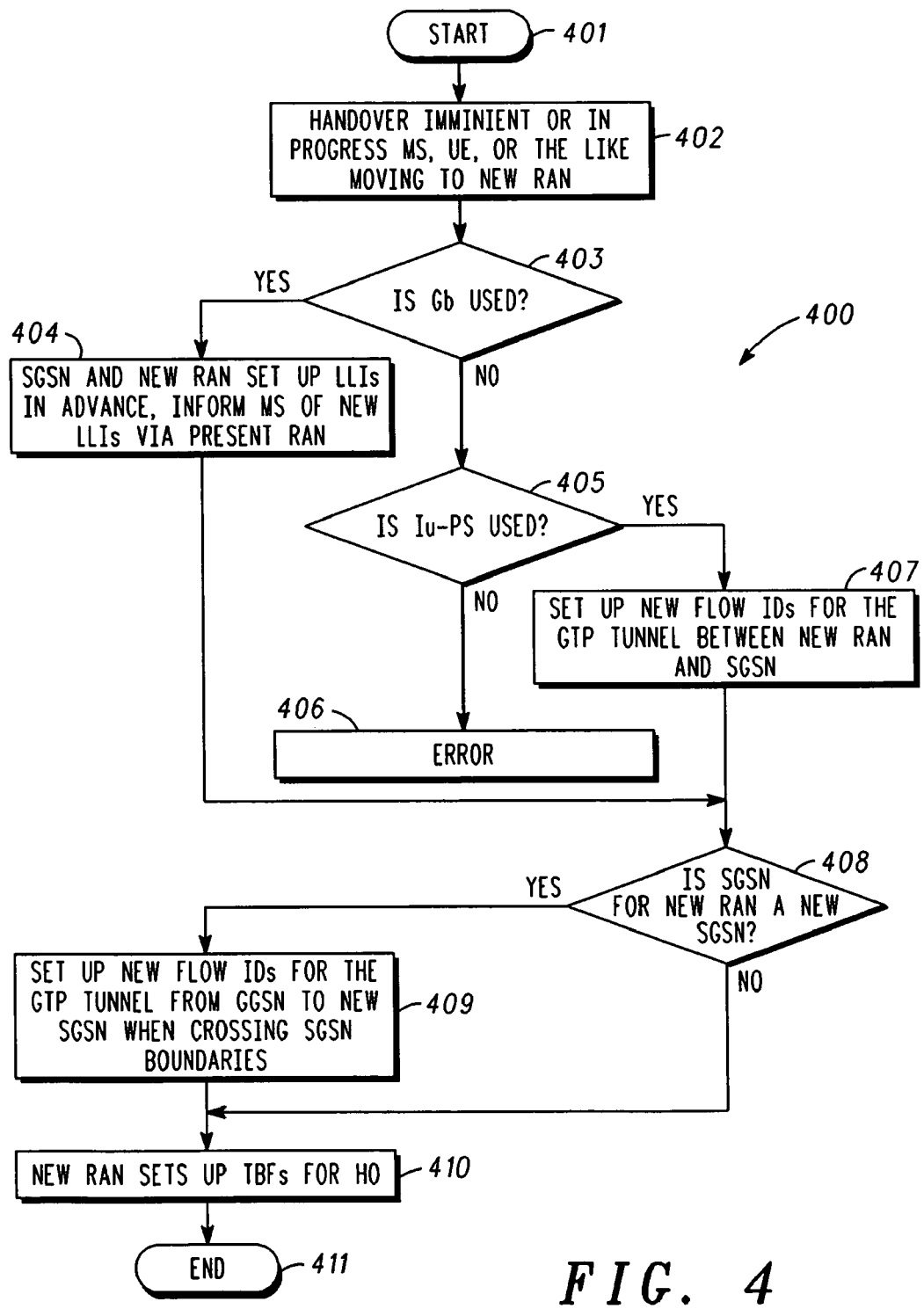
FIG. 4 is a flow chart illustrating an exemplary procedure in accordance with various exemplary embodiments.

With reference to FIG. 4, an exemplary procedure 400 which can be performed in accordance with various exemplary embodiments will be discussed and described. It will be appreciated that in accordance with some embodiments, the procedure can be implemented as a software procedure, for example, in a device, such as an infrastructure component having a processor and a memory and the ability to connect to other elements within a wireless communication system, RAN, or the like as has been described hereinabove. After start at 401, the procedure may establish that a handover between RANs is imminent or in progress, through an indication, for example, that a MS, UE, CU or the like is within range of the BTS associated with a new BSS/GERAN, within the range of a Node B transceiver associated with a new RAN/UTRAN or the like in a manner that will be appreciated by one of ordinary skill in the art. If it is determined that the Gb interface is used at 403, for example for communications between the SGSN and the new RAN, the SGSN and new RAN can set up TLLIs, for example as described above in connection with the GPRS Temporary Link Layer identifiers, in advance of the actual handover and can inform the MS, UE, CU, or the like of the new TLLIs using the present RAN at 404. It will be appreciated that the procedure of informing the MS, UE, CU or the like is not mandatory, but can be performed based on individual circumstances. Moreover, in accordance with various exemplary embodiments, regardless of the type of interface (Gb, Iu-ps) it is sufficient that the first site or RAN be notified simply that the identifiers are established and not necessarily what the identifiers are, such that the handover can be initiated.

If the Gb interface is determined not to be in use, then it can be determined whether the Iu-ps interface is used between the SGSN and the RAN at 405. If so, then new Flow IDs can be set up for the GTP tunnel between the new RAN and the SGSN. If the Iu-ps interface is not used, then it can be presumed that there is an error or the system is not compatible with 3G type systems. After setting up new TLLIs at 404 or new Flow IDs at 407, it can be determined whether the SGSN serving the new RAN is also new at 408. If so, then new Flow IDs can be set up for the GTP tunnel between the GGSN and the new SGSN at 409. If the SGSN serving the new RAN is determined at 408 not to be new, then the new RAN can set up Temporary Block Flows (TBF) for the handover as will be appreciated by one of ordinary skill in the art at 410. A TBF is a unidirectional "physical" connection between the mobile station and the RAN. It will be appreciated that in an exemplary TBF, uplink and downlink resources are separated allowing for asymmetric allocation of uplink and downlink resources. The TBF is maintained only for the duration of the data transfer.

Figure 5:
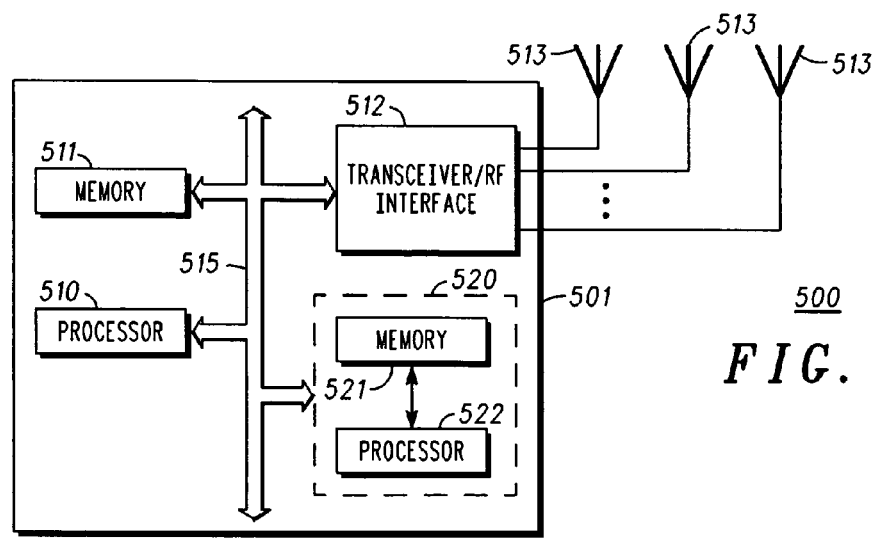
FIG. 5 is a block diagram illustrating components of an exemplary apparatus in accordance with various exemplary and alternative exemplary embodiments.

Further in accordance with various exemplary and alternative exemplary embodiments, for example, as described hereinabove, the present invention can be implemented using an exemplary apparatus 500 as shown in FIG. 5. An exemplary device 501 which can be for example, an apparatus located in a service node such as a SGSN or the like, includes a processor 510 which can be coupled to a memory 511 using a bus 515 as is well understood. An optional controller 520, or dedicated processor or the like may also be used to perform specific functions in accordance with various exemplary embodiments using for example, a controller processor 522 and a controller memory 521. Alternatively, device 501 can be embodied as a controller or the like without departing from the invention and can include subcomponents such as processors and/or controllers or the like as described herein. It will be appreciated that the controller processor 522 may be a general purpose processor dedicated to performing handover related procedures or can be a dedicated processor specifically configured to perform handover related tasks. The device 501 may further be configured with a transceiver/RF interface 512 coupled to one or more antenna or antennae 513 if the device 501 is configured to conduct communications over a radio frequency interface to a communication unit such as a MS, UE, or the like, or a base station such as a Node B, or a BTS or the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. Many such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for facilitating a handover of a session established between a wireless communication unit and a first site to a second site in accordance with an interface protocol in a wireless cellular communication system, the method comprising:
   determining that the handover of the session from the first site to the second site is imminent; and
   establishing one or more new identifiers associated with the second site and a service node in accordance with the interface protocol to form one or more established identifiers associated with the second site; and
   informing the first site of the establishing the one or more new identifiers so that the handover of the session from the first site to the second site can be initiated.

2. A method in accordance with claim 1, further comprising:
   determining if the second site is associated with a new service node; and
   establishing the one or more new identifiers associated with the second site and the new service node in accordance with the interface protocol to form the one or more established identifiers associated with the second site.

3. A method in accordance with claim 1, wherein the session includes information having a service category associated therewith, the method further comprising transferring the information to one of: the first site, the second site, both the first site and the second site, and none of the first site and the second site based on the service category associated with the information.

4. A method in accordance with claim 1, wherein the wireless communication includes one of a Mobile Station, a User Equipment, and a User Entity.

5. A method in accordance with claim 1, wherein the service node includes Serving GPRS Support Node (SGSN).

6. A method in accordance with claim 1, wherein the first site and the second site each include one of a Radio Access Network (RAN), a Universal Mobile Telecommunications Services (UMTS) Terrestrial Radio Access Network (UTRAN), a RAN/UTRAN, a GSM/EDGE Radio Access Network (GERAN), and a Base Station Subsystem/GERAN (BSS/GERAN).

7. A method in accordance with claim 1, wherein when the interface protocol includes a Gb interface protocol:
   the establishing the one or more identifiers further includes establishing one or more Temporary Link Layer Identifiers (TLLIs) in advance of the handover to form one or more established TLLIs, and
   the informing the first site of the establishing the one or more new identifiers further includes informing the first site of the establishing the one or more TLLIs; and
   the method further comprises informing the wireless communication unit of the one or more established TLLIs.

8. A method in accordance with claim 1, wherein if the interface protocol includes a Iu-ps interface protocol:
   the establishing the one or more identifiers further includes establishing one or more Flow Identifiers associated with a General Packet Radio Service (GPRS) Tunneling Protocol (GTP) and one or more of a first tunnel between the second site and the serving node, and a second tunnel between the serving node and a gateway node in advance of the handover to form one or more established Flow Identifiers.

9. A method, in accordance with claim 8, wherein the gateway node includes a Gateway General Packet Radio Service (GPRS) Support Node (GGSN).

10. A method for facilitating an inter-Radio Access Network (RAN) handover of a session established between a wireless communication unit and a first RAN to a second RAN in accordance with an interface protocol in a wireless communication system, the method comprising:
    establishing one or more new identifiers associated with the second RAN and a Serving General Packet Radio Service (GPRS) Support Node (SGSN) in accordance with the interface protocol to form one or more established identifiers associated with the second RAN; and
    informing the first RAN of the establishing the one or more new identifiers associated with the second RAN.

11. A method in accordance with claim 10, further comprising:
    determining if the second RAN is associated with a new SGSN; and
    establishing the one or more new identifiers associated with the second RAN and the new SGSN in accordance with the interface protocol to form the one or more established identifiers associated with the second RAN.

12. A method in accordance with claim 10, wherein the session includes information having a service category associated therewith, the method further comprising transferring the information to one of: the first RAN, the second RAN, both the first RAN and the second RAN, and none of the first RAN and the second RAN based on the service category associated with the information.

13. A method in accordance with claim 10, wherein the wireless communication includes one of a Mobile Station, a User Equipment, and a User Entity.

14. A method in accordance with claim 10, wherein the first RAN and the second RAN include one of a Universal Mobile Telecommunications Services (UMTS) Terrestrial RAN (UTRAN), a RAN/UTRAN, a GSM/EDGE RAN (GERAN), and a Base Station Subsystem/GERAN (BSS/GERAN).

15. A method in accordance with claim 10, wherein if the interface protocol includes a Gb interface protocol:
    the second RAN includes a Base Station Subsystem/GSM/EDGE RAN (BSS/GERAN);
    the establishing the one or more identifiers further includes establishing one or more Temporary Link Layer Identifiers (TLLIs) in advance of the handover to form one or more established TLLIs, and
    the informing the wireless communication unit of the one or more established identifiers associated with the second RAN further includes informing the wireless communication unit of the one or more established TLLIs; and the method further comprises informing the wireless communication unit of the one or more established TLLIs.

16. A method in accordance with claim 10, wherein if the interface protocol includes a Iu-ps interface protocol:
the establishing the one or more identifiers further includes establishing one or more Flow Identifiers associated with a General Packet Radio Service (GPRS) Tunneling Protocol (GTP) and one or more of a first tunnel between the second RAN and the SGSN, and a second tunnel between the SGSN and a Gateway General Packet Radio Service (GPRS) Support Node (GGSN) in advance of the handover to form one or more established Flow Identifiers.

17. A controller in a service node for facilitating an inter-Radio Access Network (RAN) handover of a session established between a wireless communication unit and a first RAN to a second RAN in accordance with an interface protocol in a wireless communication system, the controller comprising:
a interface with the first RAN, the second RAN, and a gateway node;
a memory; and
a processor coupled to the memory and the interface, the processor configured to:
determine that the handover is imminent;
establish one or more new identifiers associated with the second RAN in accordance with the interface protocol to form one or more established identifiers associated with the second RAN;
establish a tunnel identifier for a first tunnel between the wireless communication unit to the second RAN; and
inform the first RAN of the processor establishing the one or more new identifiers associated with the second RAN.

18. A controller in accordance with claim 17, wherein the processor:
in the establishing the one or more new identifiers associated with the second RAN is further configured to establish the one or more new identifiers associated with the second RAN and a new service node if the second RAN is outside a boundary associated with the service node; and
in the establishing the tunnel identifier is further configured to establish the tunnel identifier for a second tunnel between the gateway node the new service node.

19. A controller in accordance with claim 17, wherein the session includes information having a service category associated therewith, the processor further configured to transfer the information to one of: the first RAN, the second RAN, both the first RAN and the second RAN, and none of the first RAN and the second RAN based on the service category associated with the information.

20. A controller in accordance with claim 17, wherein the first RAN and the second RAN include one of a Universal Mobile Telecommunications Services (UMTS) Terrestrial RAN (UTRAN), a RAN/UTRAN, a GSM/EDGE RAN (GERAN), and a Base Station Subsystem/GERAN (BSS/GERAN).

21. A controller in accordance with claim 17, wherein if the interface protocol includes a Gb interface protocol:
the second RAN includes a Base Station Subsystem/GSM/EDGE RAN (BSS/GERAN);
the processor, in the establishing the one or more identifiers, is further configured to establish one or more Temporary Link Layer Identifiers (TLLIs) in advance of the handover to form one or more established TLLIs, and
the processor, in the informing the first RAN of the establishing of the one or more established identifiers associated with the second RAN, is further configured to inform the first RAN of the establishing of the one or more established TLLIs; and
the processor is further configured to inform the wireless communication unit of the one or more established TLLIs.

22. A controller in accordance with claim 17, wherein if the interface protocol includes a Iu-ps interface protocol:
the processor, in the establishing the one or more identifiers, is further configured to establish one or more Flow Identifiers associated with a General Packet Radio Service (GPRS) Tunneling Protocol (GTP) and one or more of a first tunnel between the second RAN and the service node, and a second tunnel between the service node and the gateway node in advance of the handover to form one or more established Flow Identifiers, and
the processor, in the informing the first RAN of the one or more established identifiers associated with the second RAN, is further configured to inform the first RAN of the one or more established Flow Identifiers.

23. A controller, in accordance with claim 17, wherein the service node includes a Serving General Packet Radio Service (GPRS) Support Node (SGSN) and the gateway node includes a Gateway General Packet Radio Service (GPRS) Support Node (GGSN).

* * * * *